Jan. 29, 1935.  E. F. ROSSMAN  1,989,498

SHOCK ABSORBER

Filed Jan. 21, 1932

Inventor

EDWIN F. ROSSMAN

By Spencer, Hardman and Fehr

Attorneys

Patented Jan. 29, 1935

1,989,498

UNITED STATES PATENT OFFICE 1,989,498

SHOCK ABSORBER

Edwin F. Rossman, Dayton, Ohio, assignor, by mesne assignments, to General Motors Corporation, Detroit, Mich., a corporation of Delaware Application January 21, 1932, Serial No. 587,901

15 Claims. (Cl. 188—88)

This invention relates to improvements in hydraulic shock absorbers.

It is among the objects of the present invention to provide a double acting hydraulic shock absorber capable of controlling both the compression and the rebound movements of the vehicle springs, said shock absorber having a pressure regulated device for controlling the restriction to the fluid flow in response to spring compression and rebound movements.

Further objects and advantages of the present invention will be apparent from the following description, reference being had to the accompanying drawing wherein a preferred embodiment of one form of the present invention is clearly shown.

Figure 1:
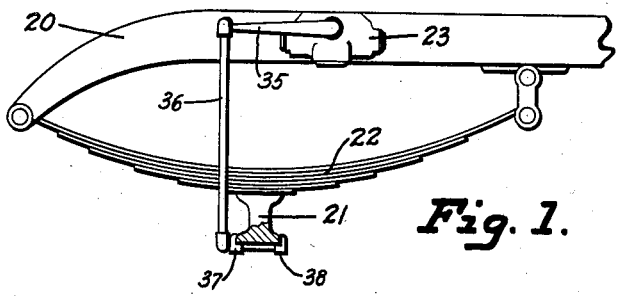
Fig. 1 is a fragmentary side view of a vehicle chassis with a shock absorber embodying the present invention attached thereto. The road wheels of the chassis are omitted for the sake of clearness.

Referring to the drawing, the numeral 20 designates the frame of the vehicle which is supported upon the vehicle axle 21 by spring 22. The shock absorber designated as a whole by the numeral 23 comprises a casing 25 which is attached to the frame 20 of the vehicle in any suitable manner. This casing provides a fluid reservoir 26 and a cylinder 27 in communication with said reservoir. The ends of the cylinder are closed by cylinder head caps 28 and 29, respectively. Within the cylinder there is provided a piston 30 which forms the spring compression control chamber 31 at the one end of the cylinder and the spring rebound control chamber 32 at the opposite end of the cylinder. The piston operating arm 33 extends into a central recess in the piston, said piston operating arm being secured to or formed integral with the rocker shaft 34 which is journalled in the casing 25 in any suitable manner, one end of said shaft extending outside the casing and having the shock absorber operating arm 35 provided thereon. The free end of this shock absorber operating arm 35 is swivelly attached to one end of the link 36, the opposite end of said link being swivelly secured to a member 37 which is anchored to the axle 21 by the clamp 38.

Figure 2:
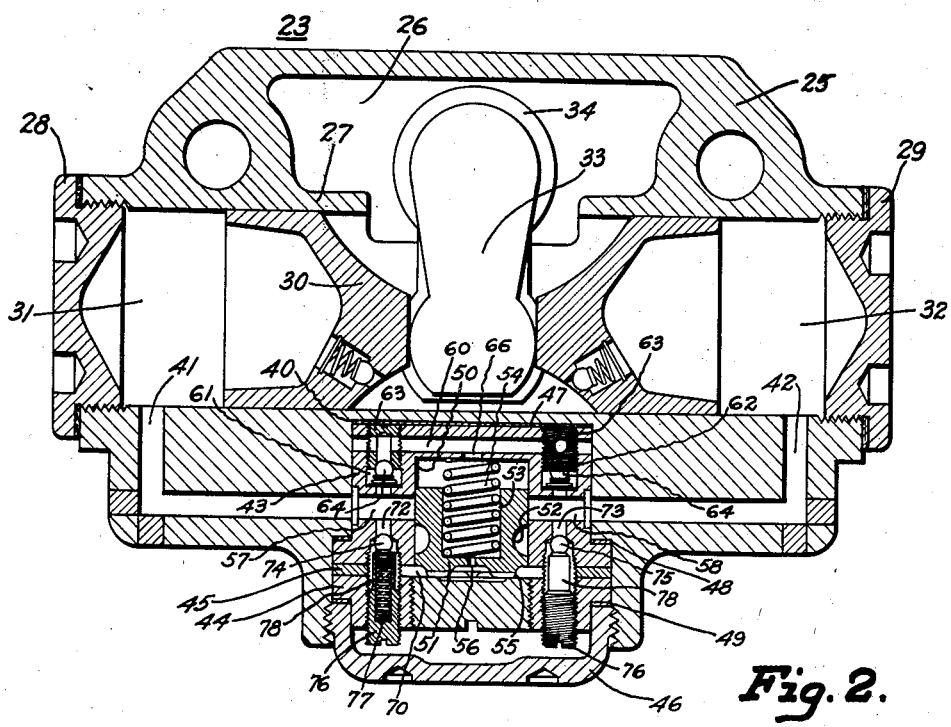
Fig. 2 is a longitudinal sectional view taken through the center of the shock absorber.

The casing 25, as shown in Fig. 2, has a recess 40 which may be termed a valve chamber. This valve chamber is in communication with the spring compression control chamber 31 and the spring rebound control chamber 32 through the ducts 41 and 42, respectively.

Chamber 40 receives the valve block 43 and the head block 44 which are maintained in spaced relation within said chamber 40 by a spacing washer 45. Both these blocks 43 and 44 are retained within the valve chamber 40 by the retainer cap 46 which is screw threaded into the outer end of the recess or valve chamber 40. Suitable packings 47, 48 and 49 are provided to prevent fluid leaks. The block 43 has a recess 50 in which the valve 51 is slidably supported, said valve 51 having an annular groove 52 for purposes to be described.

Figure 3:
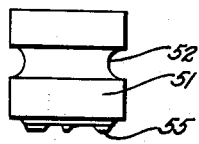
Fig. 3 is a detail view of the pressure regulated valve.

A recess 53 in one end of the valve receives a spring 54, one end of which engages the inner end of the recess 50 in block 43. This spring 54 yieldably urges the valve 51 into engagement with the head block 44. It may be seen in both Figs. 2 and 3 that valve 51 has lugs 55 extending from its lower end, or more specifically the end engaging the head block 44 whereby passages are provided between this end of the valve and the head block when said valve is resting upon said head block. An orifice 56 provides communication between the recess 53 in the valve 51 and the space between valve 51 and the head block 44, this orifice being of a predetermined size. While valve 51 is in normal position, that is, while it is resting upon the head block 44, it shuts off communication between passages 57 and 58 in the block 43 which passages communicate with the ducts 41 and 42, respectively. Thus it may be said that valve 51 normally shuts off communication between the spring compression and spring rebound control chambers 31 and 32, respectively.

In the block 43 there is provided a passage 60 communicating with chambers 61 and 62 which chambers are connected with the passages 57 and 58 respectively in said block. Each chamber 61 and 62 contains an adjustable valve seat member 63 having a ball check valve 64 yieldably urged against it. These valves are so arranged that no fluid may flow from their respective passages 57 or 58 into the passage 60, but fluid may flow from said passage 60 past these respective valves 64 into their respective block passages 57 and 58. Passage 60 is in communication with the valve containing recess 50 of block 43 through an opening 66. The space 70 between the head block 44 and the valve block 43 is in communication with both valve block passages 57 and 58. The passage 72 connects said space with the passage 57 and a similar passage 73 connects the space with the passage 58 of the valve block. Each passage 72 and 73 has a valve seat against which is yieldably urged a ball check valve 74 and 75, respectively. The head block 44 has threaded apertures coaxially aligning with the passages 72 and 73, each threaded opening in the head block 44 receiving a recessed stop screw 76 which contains a spring 77 engaging the respective ball check valves 74 or 75 to urge it upon the seat. The inner tubular end 78 of each stop screw 76 is adapted to act as a stop upon which the respective ball check valve rests when operated by fluid pressure. In order to increase the valve movement from its seat the cap screw must be screwed outwardly in the head cap, thereby increasing the distance from the tubular stop portion 78 of the cap screw and the valve seat of the respective valve and thus increasing the size of this orifice to be established by the valve when it is moved from its seat.

In the Fig. 2 all parts of the fluid flow control device are shown in normal position. If, for instance, the piston 30 is moved toward the left as regards Fig. 2 in response to the compression movement of the vehicle springs 22 during which movement the axle link and arm 35 are moved upwardly so that the shaft 34 and piston operating member 33 are rotated clockwise, pressure will be exerted upon the fluid within the spring compression control chamber 31 and thus this fluid will be forced from said chamber through the duct 41. It cannot flow directly from duct 41 to duct 42 of the spring rebound control chamber, for valve 51 normally shuts off communication between these two ducts. The fluid cannot flow from duct 41 and its communicating valve passage 57 past the valve 64 into the passage 60, for valve 64 is constructed and arranged only to discharge into the passage 57. The fluid pressure, however, may be directed against the valve 74, moving said valve away from its seat toward and against the stop provided by the tubular end 78 of the screw cap 76 thereby to establish an orifice of a predetermined size between valve 74 and its valve seat, said size being controlled by the adjustment of the stop screw 76. Now the fluid will flow into the space 70 between the valve block 43 and the head block 44, pressure being exerted upon the lower end of the valve 51. The fluid will flow from said space 70 through the restricting orifice 56 into the space inside the valve containing recess 50, thence through the opening 66 into the passage 60, thence through the member 63 moving its valve 64 from the seat and establishing a flow into the passage 58 which communicates with duct 42 and the rebound control chamber 32. Orifice 56 is considerably smaller in fluid flow capacity than is the orifice provided between valve 74 and its seat thus a differential pressure is set up within the space 70 which differential pressure overcomes the effect of spring 54 to maintain the valve 51 in its normal position so that in response to this differential pressure valve 51 will be moved upwardly and bring its annular groove 52 into communication with the transverse passages 57 and 58 in the valve block 43 so that now a restricted fluid flow will be established directly between ducts 41 and 42 through the passages 57 and 58 respectively, in communication with each other across the annular groove 52 of valve 51. The greater the fluid flow established by the orifice presented between valve 74 and its seat, the greater will be the differential pressure upon the valve 51 to move it out of normal position and thus the less will be the restriction to the flow of fluid established between ducts 41 and 42 respectively.

The same operation becomes effective when the piston 30 is moved toward the right in response to rebound movements of the vehicle springs 22. In this instance the fluid pressure will be established against valve 75, moving it from its seat to establish a flow into the space 70, thence through orifice 56 and opening 66 into the passage 60, thence past valve 64 into the transverse passage 57. In this case the differential pressure will also move the valve 51 from its normal position to establish a restricted flow between ducts 42 and 41.

The orifice presented by valves 74 and 75 may be adjusted by turning stop screws 76. These screws are accessible when the cover cap 46 is removed from the casing. The head cap 44 fits snugly within the recess of the casing so that removal of cap 46 will not permit the valve assembly to drop from the recess nor fluid to leak from the casing. The valves 64 are adjustable also, but in this case it is necessary to remove the entire valve assembly. The adjustment of valves 64 however, is seldom necessary, for these valves do not control the differential pressure which operates valve 51 to establish its variable restriction to the direct flow of fluid between compression chambers 31 and 32.

While the form of embodiment of the present invention as herein disclosed, constitutes a preferred form, it is to be understood that other forms might be adopted, all coming within the scope of the claims which follow.

What is claimed is as follows:

1. A hydraulic shock absorber comprising, in combination, a casing providing a fluid reservoir and fluid pressure chambers; means for circulating fluid between said chambers; control means normally shutting off said fluid circulation; and fluid flow orifices adapted to establish a differential fluid pressure against said control means to move it for establishing fluid circulation between the chambers.

2. A hydraulic shock absorber comprising, in combination, a casing providing a fluid reservoir, fluid displacement means and fluid compression chambers communicating with each other; control means yieldably urged normally to shut off communication between said chambers; and means of different fluid flow capacity adapted to establish a differential pressure against said control means for moving it to establish said communication between the compression chambers.

3. A control device for a hydraulic shock absorber having a casing providing a fluid reservoir, reciprocable fluid displacement means and communicating fluid compression chambers comprising, in combination; a valve yieldably urged normally to shut off said communication between the compression chamber; means adapted to by-pass fluid around said valve; and means of different fluid flow capacity in said by-pass means for establishing a differential pressure for moving the valve to establish communication between the compression chambers.

4. A hydraulic shock absorber comprising, in combination, a casing providing a cylinder; a piston in said cylinder forming two compression chambers therein; a duct connecting said chambers; means yieldably urged to close the duct; and fluid flow controlling means in communication with said duct adapted, in response to fluid pressure in either compression chamber, to establish a differential fluid pressure for moving said yieldable means to establish a variably restricted flow of fluid through the duct.

5. A hydraulic shock absorber comprising, in combination, a casing providing a cylinder; a piston in said cylinder forming two compression chambers therein; a duct connecting said chambers; a valve yieldably urged to close the duct; and different sized, constant flow orifices in communication with said duct adapted, in response to fluid pressures in the compression chamber to establish a differential fluid pressure against the valve whereby said valve will be moved to establish a variably restricted flow of fluid through the duct.

6. A hydraulic shock absorber comprising, in combination, a casing providing a cylinder; a piston in said cylinder forming two compression chambers therein; a duct connecting said chambers; a valve yieldably urged to close the duct, said valve having an orifice; means providing communication between the compression chambers through said orifice; and fluid flow control devices in said means, cooperating with said orifice to establish a differential fluid pressure for moving the valve to open the duct and establish variably restricted flows of fluid therethrough.

7. A hydraulic shock absorber comprising, in combination, a casing providing a cylinder; a piston in said cylinder forming two compression chambers therein; a duct in the casing adapted to provide communication between said chambers; a valve yieldably urged into said duct to close it, said valve having an orifice; and means of greater fluid flow capacity than said orifice, adapted to deliver fluid from the duct portions on either side of the valve to one side of the valve orifice for moving the valve to establish variably restricted flows of fluid through the duct.

8. A hydraulic shock absorber comprising, in combination, a casing providing a cylinder, a piston in said cylinder forming two compression chambers therein; a valve chamber in the casing forming a part of the main communication between the compression chambers; a valve in the valve chamber yieldably urged to shut off said main communication between the compression chambers; ducts adapted to direct fluid pressure from each compression chamber against one end of the valve for moving said valve to open the main communication between said compression chambers; and a constant fluid flow orifice in said valve for controlling the fluid pressure from either compression chamber upon said valve.

9. A hydraulic shock absorber comprising, in combination, a casing providing a cylinder; a piston in said cylinder forming two compression chambers therein; a valve chamber in the casing in communication with each compression chamber; a valve in the valve chamber yieldably urged to shut off communication between the compression chambers and the valve chamber; ducts providing for the application of fluid pressure from each compression chamber against one end of the valve for moving said valve to open communication between said compression chamber; adjustable means in said ducts for varying the fluid flow therethrough; and a fluid flow orifice in said valve, in communication with said ducts and normally of lesser fluid flow capacity than said ducts.

10. A hydraulic shock absorber comprising, in combination, a casing providing a cylinder; a piston in the cylinder forming two compression chambers therein; a valve chamber in communication with both of said compression chambers; a valve in the valve chamber; a spring engaging one end of the valve and normally urging the valve to shut off communication between the compression chambers and the valve chamber; an orifice providing a restricted connection from one end of the valve to the other; ducts providing communication between the respective compression chambers and the end of the valve opposite that engaged by the spring; and adjustable ball-check valves in said ducts adapted to establish constant fluid flows in one direction only said flows being of substantially greater volume than that established by the valve orifice.

11. A hydraulic shock absorber comprising, in combination, a casing providing a cylinder; a piston in said cylinder forming two compression chambers therein, said chambers being in communication with each other through a passage in the casing; a valve normally extending into said passage to shut off said communication between the compression chambers, said valve having an orifice providing for the transfer of fluid from one end of the valve to the other; ducts providing communication between the portions of the passage on each side of the valve, said ducts each communicating with a respective end of the valve; and valves in said ducts certain of which establish constant fluid flows from the respective passage portions on each side of the valve into said valve orifice, others establishing a flow of fluid from said valve orifice into said passage portions.

12. A hydraulic shock absorber comprising, in combination, a casing providing a cylinder; a piston in said cylinder forming two compression chambers therein, said chambers being in communication with each other through a passage in the casing; a valve yieldably urged into said passage to divide it into two non-communicating portions; ducts providing by-passes between said passage portions and around the valve; an orifice in said valve adapted to establish a flow of fluid through the valve transversely of the passage; means in one duct for establishing a constant flow of fluid from either passage portion to one end of the valve orifice only, said fluid flow being of a greater volume than the flow established by said orifice; and means in the other duct for establishing only flows of fluid from the valve orifice into one of the passage portions.

13. A hydraulic shock absorber comprising, in combination, a casing providing a cylinder in which a piston forms two compression chambers in communication with each other by a duct in one of the shock absorber members; a valve normally closing said duct; and means for diverting fluid pressure from each of said chambers against said valve, said means including differential fluid flow control devices for regulating the fluid pressure upon said valve to move it to open the duct in accordance with the fluid pressure in said duct.

14. A hydraulic shock absorber having a normally closed fluid flow control device, and means including a spring-loaded member and an orifice in the fluid flow control device having differential fluid flow capacities for establishing a mean fluid pressure for actuating said device toward open position in accordance with the pressure of the fluid flow to be controlled.

15. A hydraulic shock absorber having a chamber in which pressure is exerted upon a fluid; a normally closed pressure release valve for controlling the flow of fluid from said chamber; and devices having differential fluid flow capacities for establishing a mean fluid pressure against said valve to open it in accordance with the fluid pressure in said chamber.

EDWIN F. ROSSMAN.